United States Patent [19]

McCready

[11] Patent Number: 5,466,072
[45] Date of Patent: Nov. 14, 1995

[54] METHOD AND APPARATUS FOR RECORDING AND TRANSLATING SHORTHAND NOTES

[75] Inventor: Keith A. McCready, Chicago, Ill.

[73] Assignee: Stenograph Corporation, Del.

[21] Appl. No.: 181,386

[22] Filed: Jan. 13, 1994

Related U.S. Application Data

[63] Continuation of Ser. No. 4,916, Jan. 19, 1993, abandoned, which is a continuation-in-part of Ser. No. 822,293, Jan. 17, 1992, abandoned.

[51] Int. Cl.$^6$ .................................................. B41J 3/26
[52] U.S. Cl. ..................................... 400/91; 364/419.12
[58] Field of Search ............................. 400/63, 91, 92, 400/93, 94; 364/419.11, 419.12

[56] References Cited

U.S. PATENT DOCUMENTS

| | | | |
|---|---|---|---|
| Re. 33,337 | 9/1990 | Lefler et al. | 400/91 |
| 1,913,831 | 6/1933 | Clark | 400/91 |
| 2,319,273 | 5/1943 | Sterling | 400/91 |
| 3,557,927 | 1/1971 | Wright | 400/91 |
| 3,731,278 | 5/1973 | Eldridge et al. | 400/91 |
| 4,205,351 | 5/1980 | Michals | 400/91 |
| 4,247,208 | 1/1981 | Fulkerson et al. | 400/194 |
| 4,363,557 | 12/1982 | Fowler et al. | 400/91 |
| 4,363,558 | 12/1982 | Michals et al. | 400/91 |
| 4,439,798 | 3/1984 | Chvojcsek | 400/91 |
| 4,692,042 | 9/1987 | Cuff | 400/94 |
| 4,724,285 | 2/1988 | Lefler et al. | 400/91 |
| 4,765,764 | 8/1988 | Lefler | 400/482 |
| 5,060,154 | 10/1991 | Duncan | 400/63 |

Primary Examiner—Edgar S. Burr
Assistant Examiner—Steven S. Kelley
Attorney, Agent, or Firm—Willian Brinks Hofer Gilson & Lione

[57] ABSTRACT

A look-up table based on a conventional binary tree is implemented within a shorthand machine that performs sophisticated computer aided translations without compromising portability and long-term battery powered operation. The novel look-up table stores a translation dictionary and conserves power and memory space by providing sublevels that do not allocate memory space within the sublevel for identifying the preceding levels. Flash EPROM is utilized to further conserve power and facilitate long-term battery powered operation. The Flash EPROM may be written to by the shorthand machine, thus allowing the user to update the machine's memory. A LCD is provided for displaying several lines of the translated text as each word is translated.

45 Claims, 10 Drawing Sheets

NRBT EXAMPLE:

TABLE OF ALL POSSIBLE 1ST LETTERS OF THE NAMES, SORTED ON THE FIRST LETTER OF THE NAMES.

| 1ST CHAR. OF NAME | POINTER TO TABLE OF ALL POSSIBLE 2ND LETTERS |
|---|---|
| A | XX XX XX (3 BYTE POINTER) |
| B | XX XX XX |
| C | XX XX XX |
| D | |
| ETC. | ETC. |

TABLE OF ALL POSSIBLE 2ND LETTERS OF THE NAMES, WHERE THE FIRST LETTER HAS BEEN A B, SORTED ON THE SECOND LETTER OF THE NAMES.

| 2ND CHAR. OF NAME | POINTER TO TABLE OF ALL POSSIBLE 3RD LETTERS |
|---|---|
| A | XX XX XX (3 BYTE POINTER) |
| E | XX XX XX |
| I | XX XX XX |
| R | |
| ETC. | ETC. |

TABLE OF ALL POSSIBLE 4TH LETTERS OF THE NAMES, WHERE THE FIRST 3 LETTERS HAVE BEEN B,I,L.

| NTH BYTE OF STENO | POINTER TO ADDRESS TEXT |
|---|---|
| A | XX XX XX (3 BYTE POINTER |
| L | XX XX XX |
| ETC. | ETC. |

ADDRESS TEXT

| "123 S. MAIN ST." (STRING OF TEXT |

STRUCTURE OF THE NRBT

AT EACH LEVEL, A BINARY SEARCH IS PERFORMED IN ORDER
TO MATCH THE BYTE IN THE TABLE WITH THE BYTE BEING TRANSLATED

TABLE OF ALL POSSIBLE 1ST BYTES
SORTED ON THE FIRST BYTE

FIG 1a

| 1ST BYTE | POINTER TO TABLE OF ALL POSSIBLE 2ND BYTES |
|---|---|
| 00 | XX XX XX (3 BYTE POINTER) |
| 01 | XX XX XX |
| 02 | XX XX XX |
| 03 | |
| ETC. | ETC. |

MAIN LEVEL

TABLE OF ALL POSSIBLE 2ND BYTES WHERE THE
FIRST BYTE HAS BEEN A 00, SORTED ON THE
SECOND BYTE

| 2ND BYTE | POINTER TO TABLE OF ALL POSSIBLE 3RD BYTES |
|---|---|
| 00 | XX XX XX (3 BYTE POINTER) |
| 04 | XX XX XX |
| 07 | XX XX XX |
| 13 | |
| ETC. | ETC. |

FIRST SUBLEVEL

TABLE OF ALL POSSIBLE NTH BYTES WHERE THE
FIRST (N-1) BYTES HAVE BEEN 00, XX, ..., XX

| NTH BYTE | POINTER TO TRANSLATION TEXT |
|---|---|
| 20 | XX XX XX (3 BYTE POINTER |
| 50 | XX XX XX |
| ETC. | ETC. |

NTH SUBLEVEL

TRANSLATION TEXT

| "YES, SIR" (STRING OF TEXT) |
|---|

FIG. 1b

NRBT EXAMPLE:

TABLE OF ALL POSSIBLE 1ST LETTERS OF THE NAMES, SORTED ON THE FIRST LETTER OF THE NAMES.

| 1ST CHAR. OF NAME | POINTER TO TABLE OF ALL POSSIBLE 2ND LETTERS |
|---|---|
| A | XX XX XX (3 BYTE POINTER) |
| B | XX XX XX |
| C | XX XX XX |
| D | |
| ETC. | ETC. |

TABLE OF ALL POSSIBLE 2ND LETTERS OF THE NAMES, WHERE THE FIRST LETTER HAS BEEN A B, SORTED ON THE SECOND LETTER OF THE NAMES.

| 2ND CHAR. OF NAME | POINTER TO TABLE OF ALL POSSIBLE 3RD LETTERS |
|---|---|
| A | XX XX XX (3 BYTE POINTER) |
| E | XX XX XX |
| I | XX XX XX |
| R | |
| ETC. | ETC. |

TABLE OF ALL POSSIBLE 4TH LETTERS OF THE NAMES, WHERE THE FIRST 3 LETTERS HAVE BEEN B,I,L.

| NTH BYTE OF STENO | POINTER TO ADDRESS TEXT |
|---|---|
| A | XX XX XX (3 BYTE POINTER) |
| L | XX XX XX |
| ETC. | ETC. |

ADDRESS TEXT

"123 S. MAIN ST." (STRING OF TEXT)

METHOD AND APPARATUS FOR RECORDING AND TRANSLATING SHORTHAND NOTES

STATEMENT OF RELATED APPLICATIONS

This application is a continuation of U.S. application Ser. No. 08/004,916 filed on Jan. 19, 1993, now abandoned, which is a continuation-in-part of U.S. application Ser. No. 07/822,293, entitled "METHOD AND APPARATUS FOR RECORDING AND TRANSLATING SHORTHAND NOTES," filed Jan. 17, 1992 now abandoned. The entire disclosure of Ser. No. 07/822,293 is incorporated herein by reference.

FIELD OF THE INVENTION

This invention relates in general to recording and translating shorthand notes. More particularly, this invention relates to a method and apparatus for recording and translating shorthand notes using a single self-contained unit.

BACKGROUND OF THE INVENTION

Stenography is a widely used technique for recording the spoken word. The basic process includes two steps: (1) making a phonetic record of the speech being recorded, and (2) transcribing the phonetic record into a grammatical record such as, by way of example, an English language transcript. To ensure reliability and efficiency in the recording process, and to simplify the translating process, shorthand machines are frequently employed to produce the phonetic record. Such machines are especially useful when the recording is made over a relatively long period of time, for example in the courtroom or at a business meeting.

A widely used shorthand machine has a keyboard of twenty-two phonetically related symbols and characters which, to the skilled operator, provide the combinations necessary to record all English language words. The record produced by the machine is a paper tape on which the phonetic characters are printed. To record a word or part of a word, the operator strokes an appropriate combination of keys and the machine prints the characters simultaneously on an interval of the paper tape. The tape is advanced one interval after each combination is recorded.

For example, the paper tape record of the sentence, "You should be able to read these short words," would appear as follows on the paper tape:

|   |   |   |   | U |   |   |    |
|---|---|---|---|---|---|---|----|
| S | H |   |   | U |   | D |    |
|   |   | A |   |   | B |   |    |
| T |   |   | O |   | BL|   |    |
|   |   | R |   | E |   | D |    |
| T | H |   |   | E |   | S |    |
| S | H |   | O |   | R | T |    |
|   |   | W |   | O |   | R | DZ |

A general description of this type of machine is given in U.S. Pat. No. 2,319,273 entitled "Stenographic Machine," issued to J. G. Sterling and assigned to the assignee of the present invention. The entire disclosure of U.S. Pat. No. 2,319,273 is incorporated herein by reference.

The shorthand machine provides both reliability and economy in the recording process. However, the translating process, while improved through the use of a shorthand machine, remains time consuming. The operator must read back the paper tape containing the phonetic characters and make a corresponding grammatical record.

U.S. Pat. Nos. 3,557,927; 4,205,351; and 3,832,733 describe improvements in the purely mechanical shorthand machine wherein the machine is modified to provide an electrical output in response to an operator engaging an appropriate combination of keys. The electrical output may be recorded on a computer-readable medium such as a floppy disk which may be read by a computer. The computer performs the translation by comparing the input characters from the shorthand machine with a grammatical reference stored in the computer's memory. In its simplest form, the grammatical reference is a "dictionary" which relates all English language words to their phonetic or machine shorthand equivalents.

By way of background it should be noted that the following terms are used throughout this disclosure and are to be given their intended meaning as understood in the art:

The term "stroke" refers to the act of an operator engaging the keys of a shorthand machine with sufficient force to impress a symbol or character on the paper tape, and/or to produce an electrical output representing the symbol.

The terms "symbol" and/or "character" mean any representation of word construction including but not limited to letters of an alphabet. The term "combination" is intended to include single as well as multiple elements.

The terms "phonetic words" and/or "shorthand notes" mean a particular combination of phonetic characters which may form all or part of the phonetics of a spoken word.

The terms "translated text", "language text" or "reader usable text" refer to the particular combination of characters that form a written word.

Computer programs that translate shorthand notes are referred to generally as computer-aided transcription ("CAT") systems. CAT systems, such as the OzPC made by Stenograph Corp., can be run on IBM and compatible PC's utilizing a DOS operating system. CAT dictionaries are stored in a look-up table in memory, and the shorthand notes are translated by searching through the look-up table. The basic look-up table begins by storing a number of equivalents in its memory locations. For example, a particular entry would indicate that the shorthand note "shud" is equal to the word "should." In performing a translation, the system would search through the look-up table to find the entry for "shud" and then output the equivalent grammatical word. Look-up tables can be organized and searched in a variety of known schemes, some examples of which include the "sequential", "hash" and "binary-tree" methods. These methods vary in speed, memory space and power requirements.

The binary-tree look-up table is the fastest of the three and the most efficient. Under a binary-tree approach, the computer performs an operation similar to searching for a name in the phone book. Looking for the name "Walter", the binary-tree does not simply start with the A's and plow through to the W's. Instead, it divides the book in half and asks itself which half Walter is in. This process is repeated for each appropriate half, further dividing the list until the matching item is found.

Although powerful, known CAT systems have constraints. For example, a PC is needed in order to perform the translation. Also, the recorded notes must be transferred from the shorthand machine to the PC which is usually remote from where the notes are originally transcribed.

A company known as "Digitext" has sold a shorthand machine that performs electronic translation and displays the translation one word at a time on a one-line LCD display. This machine is apparently designed as a teaching aid, and thus, does not have the general portability and flexibility that would be required for practical use. For example, the dictionary is stored in a relatively small and slow memory (approximately 10,000 entries) that is not user definable. Also, the Digitext device must be connected to an electrical outlet and is not provided with a manual mode or battery operation.

Thus, it is an object of this invention to provide a novel method of organizing and searching a look-up table.

It is another object of this invention to provide a shorthand machine capable of recording shorthand notes and translating these notes into user readable form.

It is another object of the present invention to provide a self-translating shorthand machine having a user updatable on-board translation dictionary.

It is another object of this invention to provide a flexible, portable and battery-operated shorthand machine with powerful and sophisticated display capabilities.

It is another object of this invention to provide a shorthand machine capable of performing computer aided translation and displaying the translation on several lines of an LCD.

It is another object of this invention to provide a novel method of organizing and searching a look-up table.

SAY OF THE INVENTION

This invention relates to a self-translating shorthand machine. The shorthand machine is provided with a keyboard having key contacts for converting keystrokes into electrical output representations of the phonetic word entered by the operator. The electrical outputs are fed into a CPU which is connected to a disk drive, I/O ports, read only memory (ROM), random access memory (RAM) and a liquid crystal display (LCD). A translation dictionary is stored in a look-up table in ROM. Control programs direct the CPU to translate the entered phonetic words into one or more written languages such as English, Korean, German, Spanish or others. The translated text is displayed in a readable format on the LCD which has the graphic capabilities to display any number of languages and is large enough to display several lines of text. Alternatively, the translated text may be recorded on a disk in the disk drive, or communicated to a peripheral device via the I/O ports. The stored translated text may be manipulated in any number of ways. For example, function keys are provided to allow the operator to "scroll" through the translated text and display any portion of it on the LCD. Additionally, the translated text may be searched for a particular word, phrase or other mark, and, when a match is found, the corresponding portion of the translated text can be displayed on the LCD.

In another aspect of this invention, at least a portion of the above-described read-only-memory is "flash" EPROM. Flash EPROM is non-volatile memory and requires no power to maintain its contents. Unlike conventional EPROM, Flash EPROM may be erased and written to by applying a voltage which may be supplied by the shorthand machine. Thus, the shorthand machine can load dictionary entries, program instructions and other information into Flash EPROM via the disk drive, the I/O ports or the keyboard.

In another aspect of this invention, the translation dictionary is searched and organized using a non-redundant binary-tree (NRBT) look-up table stored in ROM. Like the conventional binary-tree, the NRBT's memory is organized as a set of main level memory locations which branch into sublevel locations. These sublevels branch into their own sublevels until all of the words are defined. The NRBT begins its search by dividing its main level in half and determining whether the first character of the input search word is in one half or the other. This divide and search procedure continues until the first character is located. However, unlike conventional binary-tree search techniques, the NRBT does not allocate memory space in sublevels to the characters identified in preceding levels. Thus, the first sublevel under the memory location for the letter P would not begin with the letter P. Consequently, the NRBT needs only approximately three-fourths of the memory space required by a conventional binary-tree look-up table to store the same amount of information. The NRBT may be searched extremely fast, and its reduced size allows for more entries in a given ROM space. Thus, powerful storing and searching techniques may be implemented in a lower-power, battery operated device.

In yet another aspect of this invention, the above-described self-translating shorthand machine is also provided with means for creating a conventional paper tape record of the shorthand notes.

BRIEF DESCRIPTION OF THE DRAWINGS

The invention is described in greater detail in the following description of the preferred embodiment taken in conjunction with the drawings in which:

FIG. 1a illustrates the structure of a NRBT look-up table embodying one aspect of the present invention;

FIG. 1b illustrates one example of the NRBT look-up table illustrated in FIG. 1a;

DESCRIPTION OF THE PREFERRED EMBODIMENT

NRBT

The general structure of a NRBT look-up table embodying the present invention is illustrated in FIG. 1a. The NRBT includes a main level of memory locations each having an associated sublevel of memory locations. Each sublevel is further divided into its own sublevel, and this division continues until the item is sufficiently defined. Each location also includes a three byte pointer directed to the sublevel associated with the subject location. Once a particular sublevel is reached, there is no memory allocated to the matched character from the previous level. The NRBT thus requires approximately three-fourths of the memory locations needed by conventional binary-tree look-up tables to store the same amount of information. Consequently, the NRBT's reduced size requires significantly less storage space than a larger conventional binary-tree structure.

Figure 2:
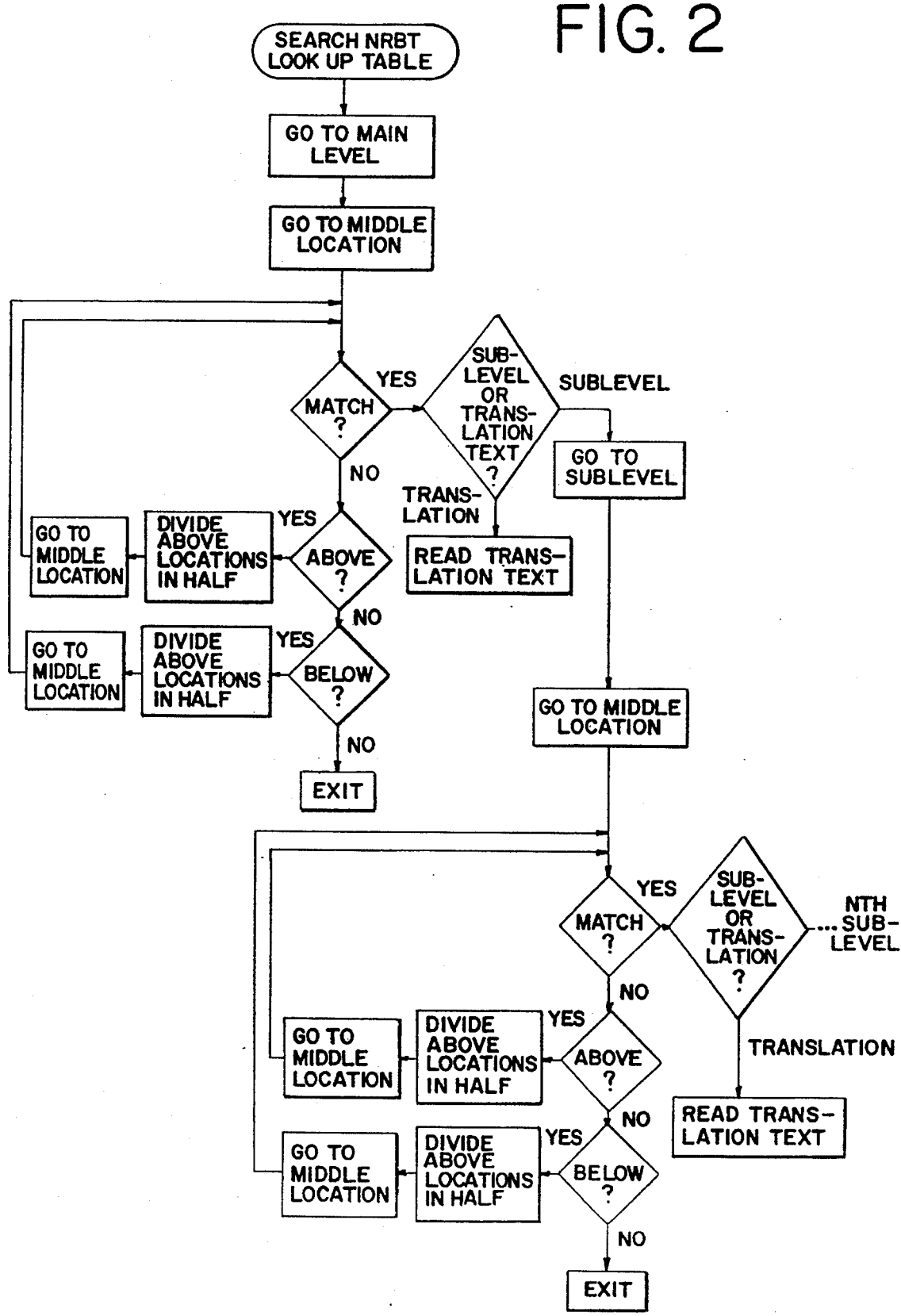
FIG. 2 is a flow diagram illustrating a preferred operation of a program for searching the NRBT look-up table shown in FIGS. 1a and 1b.

The NRBT look-up table is further illustrated by way of example shown in FIG. 1b and the flow diagram shown in FIG. 2. The flow diagram illustrates the general operation of a control program that could be used to perform the desired search steps. Assume, for example, that the NRBT look-up table has been used to store an alphabetical listing of names and a corresponding address associated with each name. A search request is entered for Bill's address. The first letter of the name "Bill" is searched first. The program begins the search by going to the "middle location" in the main level and asking "is this a match?" If the answer to the "is this a match?" inquiry is yes, the program asks whether the pointer bytes in this location are directed to a "sublevel or translation text?" If the answer is sublevel, the program moves to the sublevel to search for the next character. If the answer is translation text, the program reads the contents of the translation text memory location. If the answer to the "is this a match?" inquiry is no, the program asks whether the search character is "above?" this location. If the answer to the "above?" inquiry is yes, the program divides the "above" locations in half and directs the memory to the "middle location" in the "above half." The program then returns to the "is this a match" inquiry. If the answer to the "above?" inquiry is no, the program asks whether the search character is "below?" this location. If the answer to the "below?" inquiry is no, the program exists. If the answer to the "below?" inquiry is yes, the program divides the "below" locations in half and directs the memory to the "middle location" in the "below half." The program then returns to the "is this a match?" inquiry. This is continued until the main level location containing B is found.

The NRBT then searches the B sublevels for the next letter (I) in the same manner as the main level. The B sublevel locations, however, do not begin with the letter B. Because we know that we are in the B sublevel, it is redundant to allocate memory space within this sublevel to the character B. The B sublevel is divided and searched until I is located. Similar to the B sublevel, entries within the BI sublevel begin with the third character rather than BI. This structure is continued until there is no ambiguity between entries, or there are an arbitrary number of entries (usually five) to choose from, each of which is checked against the character(s) being searched. When the last "L" in "BILL" is located, the pointer bytes in this location are directed to the translated text memory location described above. For the example shown in FIG. 1a, this location contains BILL's address.

FLASH EPROM

The above-described NRBT look-up table may be stored in a "flash" EPROM. Flash EPROM memory is nonvolatile and requires no power to maintain its content. Unlike conventional EPROM, Flash EPROM may be erased and written to by applying 12 volts which may be supplied by the host device. Thus, the contents of the NRBT look-up table can be easily changed without removing the memory from the host device.

RECORDING AND TRANSLATING SHORTHAND MACHINE

Figure 3:
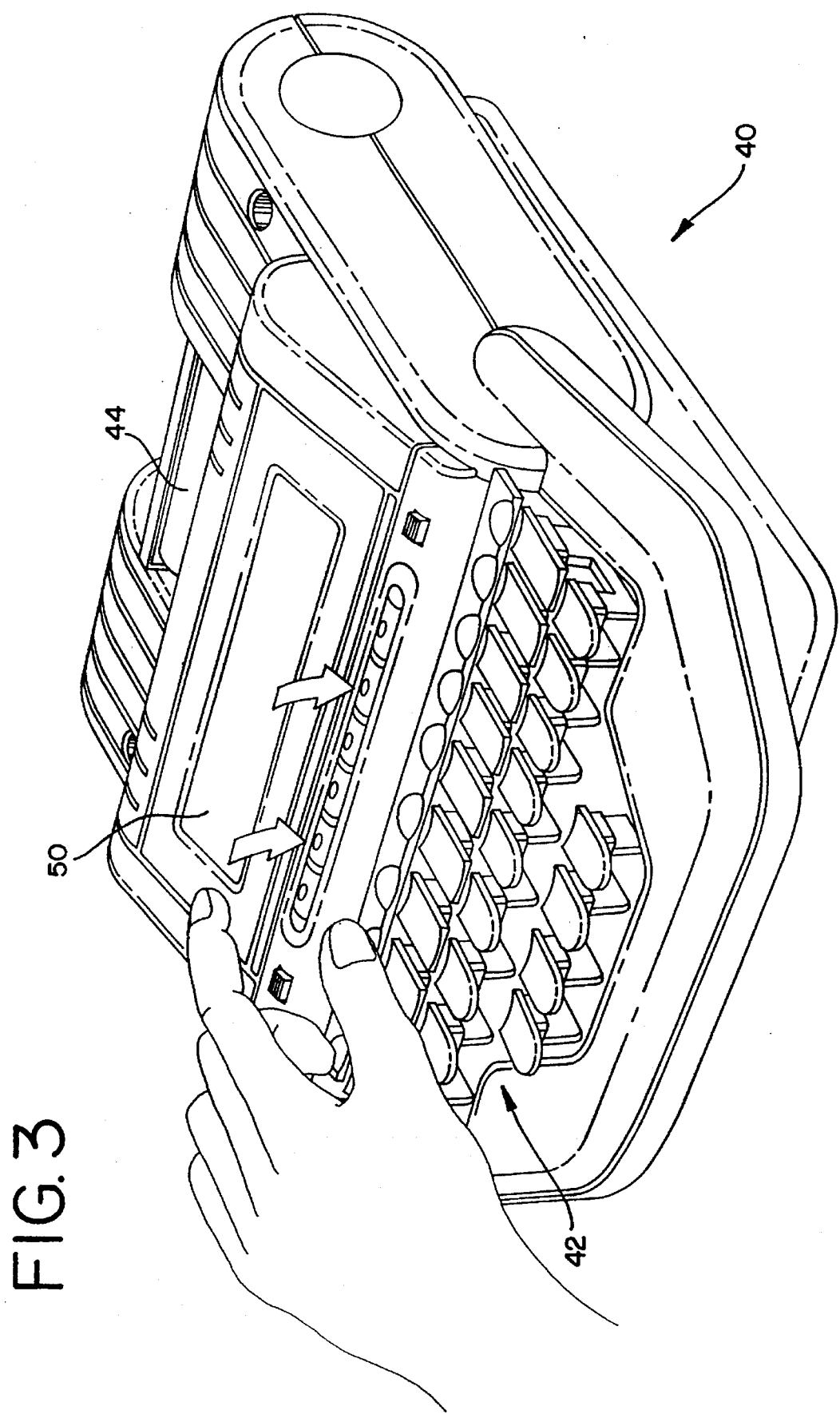
FIG. 3 is a perspective view of a recording and translating shorthand machine embodying the present invention.

A shorthand machine embodying the present invention is illustrated in perspective in FIG. 3 and is designated in general by the reference numeral 40. The illustrated shorthand machine is a completely self-contained unit that records and translates shorthand notes immediately after they are entered by an operator. The machine 40 can mechanically imprint the notes on a paper tape (not shown), convert the notes to a machine readable format such as a floppy disk, and translate the notes into text and display the text on an LCD 50. The machine 40 can also convert the translated text to ASCII format and record the text on a disk. Alternatively, the machine 40 can output the translated text to a peripheral device via I/O ports 66. One or more function keys 70 on the machine 40 allow the operator to "scroll" through the translated text and display any portion of it on the LCD 50. The function keys 70 also allow the operator to search the translated text for a particular word, phrase or other mark, and, when a match is found, display the corresponding portion of the translated text on the LCD 50. In addition, the function keys 70 may also act as "soft" keys. The tasks performed by a particular soft key 70 depend on what other function key 70 has been activated. For example, a first function 70 key may activate the digitally controlled paper spacing function, and a second function key 70 (also a soft key) may activate the stenomark function. When the first function key is activated, the second function key may be redefined to perform a task related to the digital paper spacing function, such as increasing the paper spacing.

Figure 4:
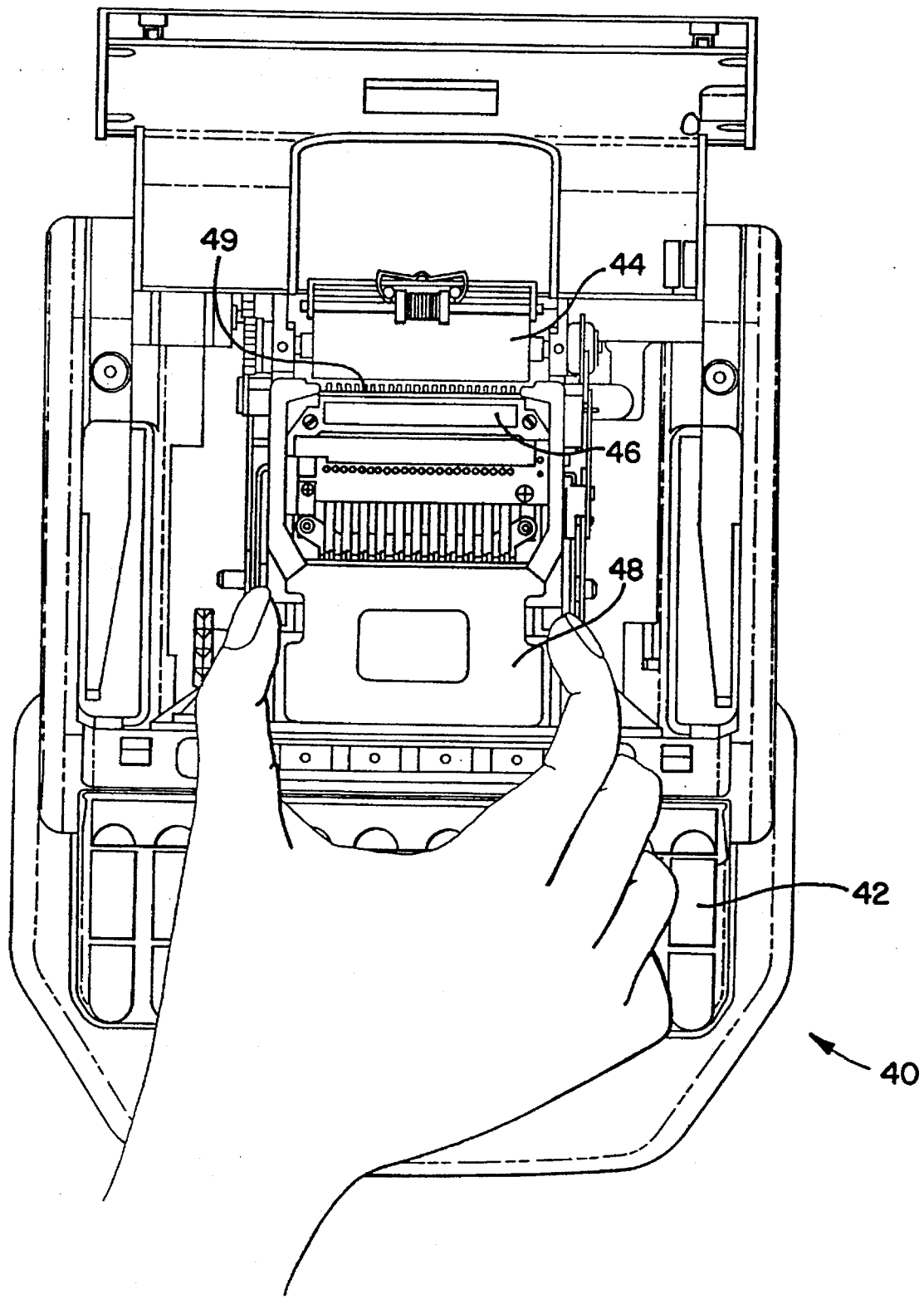
FIG. 4 is a top plan view of the shorthand machine of FIG. 3 with its cover open.
Figure 5:
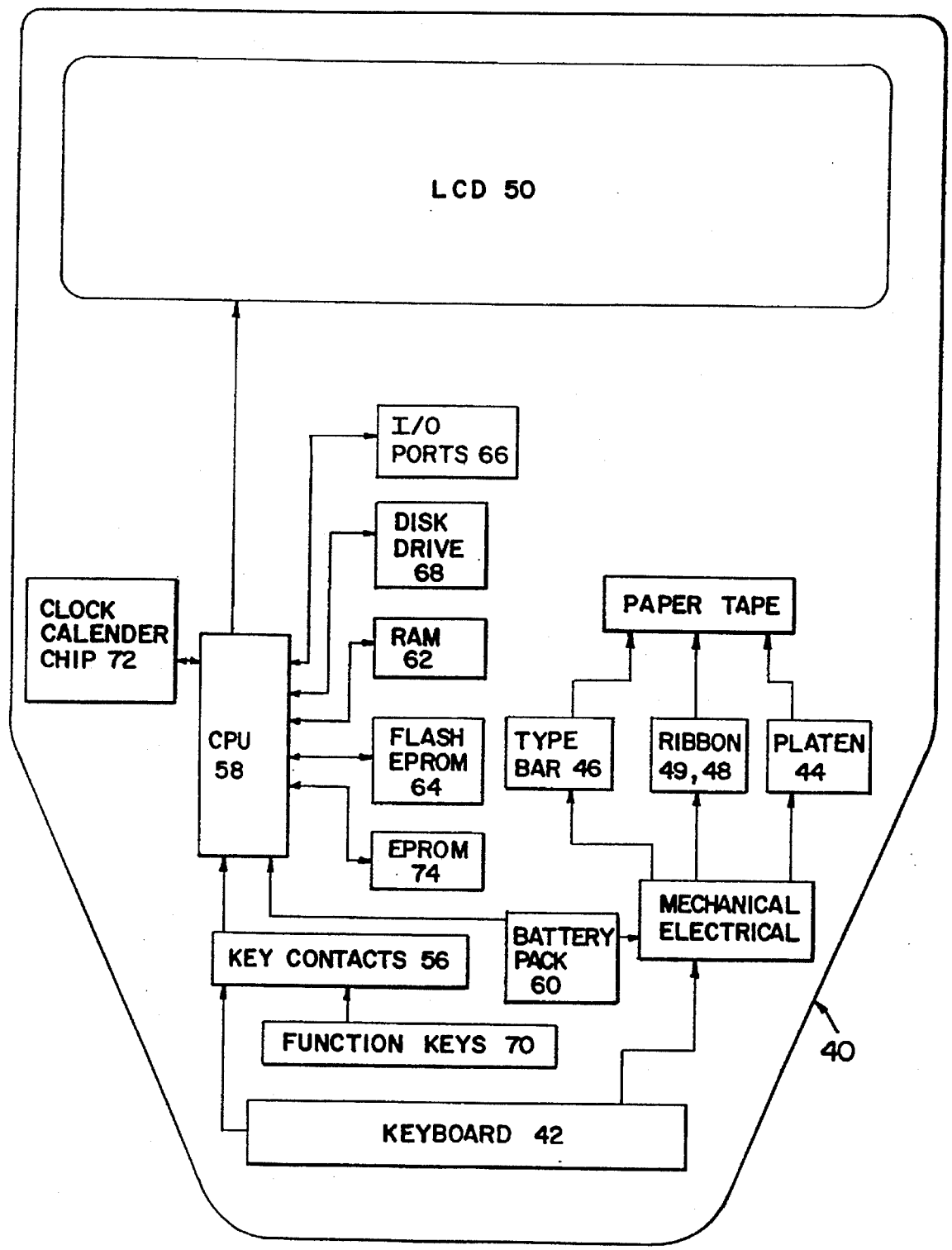
FIG. 5 is a block diagram illustrating some of the hardware components of the shorthand machine shown in FIGS. 3 and 4.

As shown in FIGS. 3–5, the shorthand machine 40 includes a keyboard 42 having a plurality of keys which, when stroked by an operator, produce a paper tape record of the phonetic words entered. Each key represents an alphanumeric symbol which is reproduced on the paper tape (not shown) when the key is stroked by the operator. The paper tape is carried over a rubber platen 44. A type bar 46 is associated With each key and is advanced toward the platen 44 when the particular key is stroked. A disposable ink cartridge 48 is provided for feeding an inked ribbon 49 between the type bars 46 and the platen 44. Additional details regarding the disposable cartridge 48 are described in co-pending, commonly assigned U.S. patent application Ser. No. 07/822,638, filed Jan. 17, 1992, entitled "Disposable Ribbon Cartridge For Shorthand Machines." The entire disclosure of application Ser. No. 07/822,638 is incorporated herein by reference.

An internal advancing mechanism (not shown) is located inside the cartridge 48 for feeding the inked ribbon 49 between the type bars 46 and the platen 44. The advancing mechanism is driven by a mechanical connection to the keyboard 42 so that the ribbon 49 is advanced each time a key is depressed. Also, the paper tape is advanced by mechanical/electrical components 54 for rotating the platen 44 each time one or more of the keys is stroked. The shorthand machine 40 is also provided with control programs that provide digitally controlled paper spacing for determining the distance the paper tape is advanced for each stroke. When the digital paper spacing function is activated, the control program places a graphic spacing gauge on the LCD 50. The "soft" function keys 70 are used to increase or decrease the amount of space the paper is fed between strokes, and the space changes are reflected on a graphic gauge. The type bars 46 associated with the stroked keys urge the inked ribbon 49 into contact with the paper at the platen 44 for impressing an ink symbol thereon.

Turning now to FIG. 5, a block diagram of the internal components of the shorthand machine 40 is illustrated. The keyboard 42 is connected to mechanical/electrical components 54 which can perform several printing related operations including advancing the platen 44, advancing the ribbon 49, and moving the type bars 46 toward the platen. These and other printing related operations may be performed in a conventional manner, and thus need not be described in detail herein. The details of various mechanical and electrical components for operating the platen, the ribbon, the type bars, and other functions, are described in U.S. Pat. Nos. 2,319,273; 4,421,427; and 4,363,558. The entire disclosure of each of these patents is incorporated herein by reference.

The shorthand machine 40 also includes key contacts 56 connected to the keyboard 42 for converting keystrokes into an electrical output representing the phonetic word entered by the operator. The key contacts 56 may be implemented in a known manner, and thus are not set forth in detail herein. A description of suitable key contacts for the shorthand machine 40 may be found in U.S. Pat. Nos. 3,557,927; and 4,205,351. The entire disclosure of each of these patents is incorporated herein by reference.

The output from the key contacts 56 is fed into a CPU 58. The CPU 58, rechargeable battery 60, RAM 62, Flash EPROM 64, EPROM 74, clock/calendar chip 72 and LCD 50 are interconnected and combine to perform sophisticated computer-aided translations. In a known manner, the CPU 58 coordinates the movement of information and does the actual computing. The CPU 58 is designed to recognize an instruction set, which may be electronic codes that tell it to perform specific functions. All programs are made up of sequences of such codes and, when a program is run, the CPU 58 executes the instructions one at a time, at a very high speed. Also in a known manner, the RAM 62 performs conventional functions, including manipulating and storing data.

The fundamental control programs may be stored in the Flash EPROM memory 64. These programs instruct the machine's hardware to perform a number of functions, such as starting the machine, searching the look-up table, communicating with the I/O ports, writing to the disk drive, manipulating and displaying the stored translated text, and others. Alternatively, a portion of the core programs and instructions that are unlikely to be changed or updated may be stored in EPROM 74, while the programs and instructions that are desired to be accessible are stored in Flash EPROM 64. The program algorithms, shown in FIGS. 2 and 6–8 and described throughout this disclosure, are provided as examples. The particular form of the control program is not essential, and, if given the specific parameters set forth in this disclosure, a skilled programmer could routinely develop other control programs equally suitable to practice this invention.

The LCD 50 is an intelligent text (eight line by forty character) or graphic (six line by 50 character) display. The LCD 50 is capable of displaying translations in a variety of fonts (size and style) and languages including Korean, English, German, French, Italian, Spanish, Portuguese, and others. The control program directs the LCD 50 to open its display, and can change any portion of the display on demand. Thus, error prompts, system status and other system requests can be communicated to the operator via the LCD 50. Also, a clock/calendar chip 72 in the machine 40 allows the control program to display the date, time and/or elapsed time on the LCD 50 in any manner desired. If displayed continuously, the operator has a readily accessible record of the length of a transcribing session. The control program also provides a word-wrap function for the displayed translated text. If a word is started on a line where there is not enough space to complete the word, the word-wrap function takes the complete word to the next line, rather than breaking the word in two and placing part of the word on one line and the rest of the word on the following line.

The CPU 58 is also connected to a disk drive 68. If desired, the entered shorthand notes and/or the translated text may be recorded directly to a disk in the disk drive 68. The disk drive 68 may also be used to read information such as job dictionaries or particular control programs into Flash EPROM 64 or RAM 62.

In the preferred embodiment of the shorthand machine 40, the translation dictionary is stored in Flash EPROM 64 and configured as the NRBT look-up table described herein. The dictionary can include a core or personal dictionary which contains the stroke translations used repeatedly by the operator. The dictionary can also include one or more job dictionaries which contain stroke translations relevant to a particular transcribing session. For example, when recording the deposition of Keith McCready regarding microprocessors, the operator may define the stroke "KMC" as "Keith McCready" and the stroke "MP" as "Microprocessor" Both of these stroke translations can be loaded into the shorthand machine 40 through the disk drive 68 or the I/O ports 66, and stored in a particular job dictionary. The job dictionaries are independent of one another, and thus, the same operator could also define the stroke "MP" as "Mount Prospect, Ill." in a separate job dictionary used for a different transcribing session. Accordingly, the shorthand machine 40 may be quickly and easily customized for each operator.

2 MB of Flash EPROM can store approximately 100,000 dictionary entries using the NRBT. This is approximately three-fourths the memory space that would be required to store the same size dictionary in a conventional binary-tree look-up table. The smaller memory requirements of the NRBT require very little power to operate. The battery 60 provides power for all of the electronic components of the shorthand machine 40.

Table 1 lists presently preferred components suitable for use in the shorthand machine 40. Although the identified components have been found suitable, the invention is of course capable of being implemented with a wide variety of other hardware.

TABLE 1

| | Description | Identification |
|---|---|---|
| 58 | 6 Mhz CPU | Hitachi HD 64180 |
| 60 | 7.2 Volt Battery Pack | Available from Stenograph |
| 62 | 128K RAM | Samsung 28128 |
| 64 | 2 MB Flash EPROM | Intel 28F010 |
| 50 | 240 × 64 Text/Graphic LCD Display | Toshiba TLX711 |
| 68 | 1.44 MB 644 HZ Disk Drive | Teac FD 335 |
| 66 | RS232 Port Interface Chip | Available from numerous vendors |
| 72 | Clock/Calendar Chip | Available from numerous vendors |

The control program illustrated in FIG. 2 can be implemented in the machine 40 to control and search the NRBT look-up table. Each translated word is accumulated in a text file which may be stored in the RAM 62 and/or written to a disk in the disk drive 68. Additionally, each stroke entered at the keyboard 42 is converted to an electric signal and accumulated in a notes file which may be stored in RAM 62 and/or written to a disk in the disk drive 68. In the preferred embodiment, the files are accumulated in a RAM buffer until there are enough locations to write an entire sector of the disk. Thus, the program does not continually write entries to the disk, but instead transfers the entries in blocks. Thus, as the machine 40 performs its translations it accumulates all of the previously entered strokes and their corresponding translations in memory.

Figure 6:
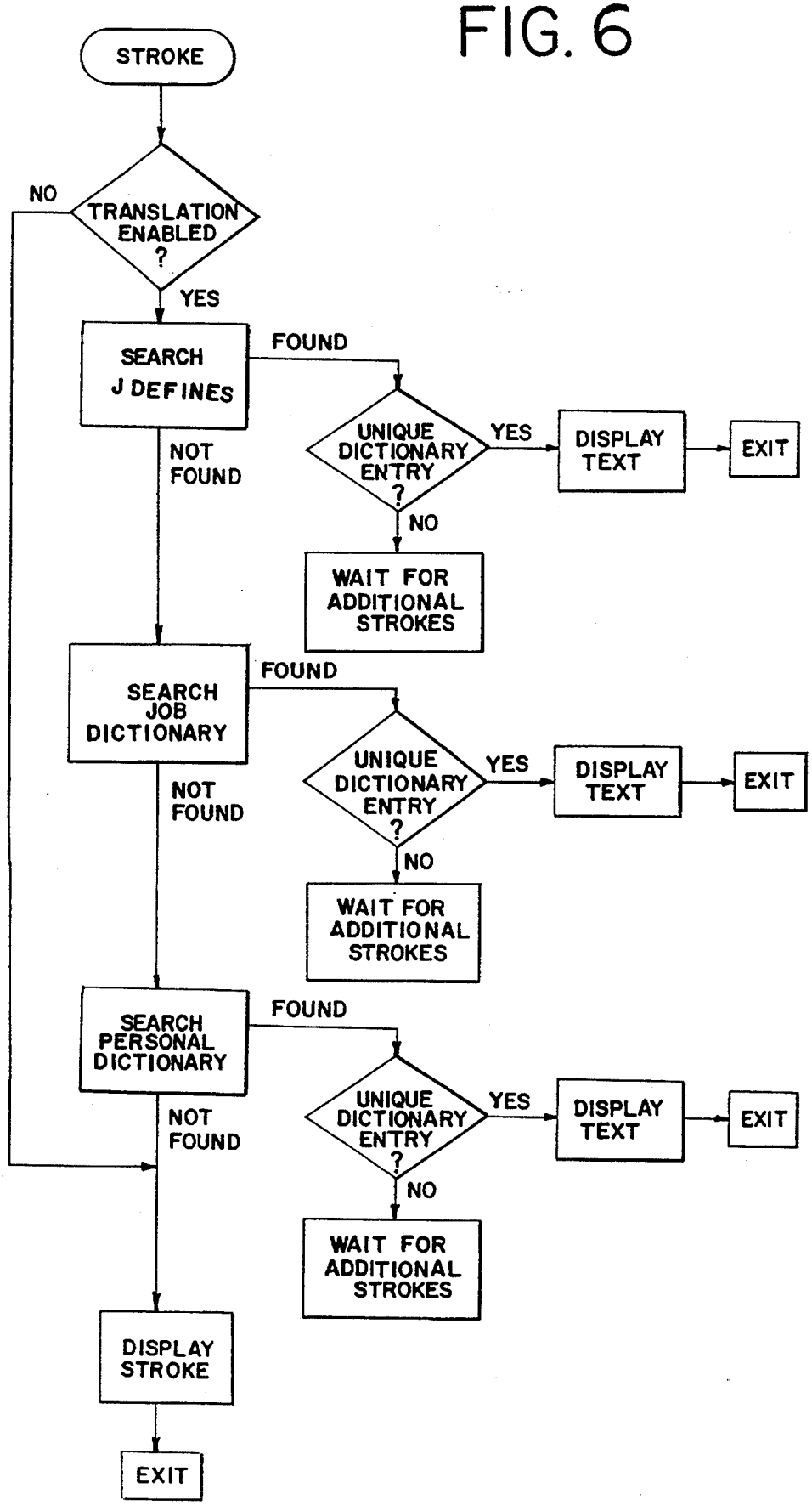
FIG. 6 is a flow diagram illustrating a preferred operation of a program for translating shorthand notes into translated text and displaying the translated text on the LCD of the shorthand machine shown in FIGS. 3–5.

Turning to FIG. 6, a preferred operation of a control program for obtaining and displaying the translation will now be described. A stroke is entered at the keyboard and the program asks whether or not the translation is enabled. If the translation is not enabled, the shorthand stroke is displayed on the LCD 50. If the translation is enabled, then the "Jdefines" dictionaries are searched in the manner illustrated in FIG. 2. The Jdefines dictionaries contain specially defined strokes that are created by the operator and loaded into the Jdefines dictionaries using the keyboard 42 of the shorthand machine 40. The Jdefines strokes are entered by first pressing a function key 70 for activating the Jdefines function. The operator then enters the stroke at the keyboard, followed by the stroke's translation. Up to six strokes can define a single Jdefine entry, and that Jdefine can display up to 128 characters of translation text on the LCD 50 and in the notes file. The Jdefines entries are written out to the disk drive in a separate file that can then be read by a CAT system in order to be merged back into the job or personal dictionaries.

If the Jdefine stroke is found, the program then asks whether a "unique dictionary entry?" is found. A unique entry means that only one translation was found for the entered stroke. On occasion, a phonetic word is comprised of more than one stroke, and accordingly, more than one stroke may need to be searched in order to acquire the translation. If the answer to the "unique dictionary entry?" inquiry is yes, the program displays the translated text on the LCD and exits. If the answer to the "unique dictionary entry?" inquiry is no, then the program waits for additional strokes.

If the stroke is not found in the Jdefines dictionary, the program then searches the job dictionary in the same fashion as the Jdefines dictionary. If the stroke is found, the program then asks whether a "unique dictionary entry?" is found. A unique entry means that only one translation was found for the entered stroke. On occasion, a phonetic word is comprised of more than one stroke, and accordingly, more than one stroke may need to be searched in order to acquire the translation. If the answer to the "unique dictionary entry?" inquiry is yes, the program displays the translated text on the LCD and exits. If the answer to the "unique dictionary entry?" inquiry is no, then the program waits for additional strokes.

If the stroke is not found in the job dictionary, the program then searches the personal dictionary in the same fashion as the job and Jdefines dictionaries. If the stroke is found in the personal dictionary, the program then determines whether the dictionary entry is unique. If the stroke is not found in the personal dictionary, the program displays the stroke and exists.

FIG. 6 also illustrates the translation precedence of the control program. The Jdefines dictionary entry for a stroke takes precedence over the same stroke in the job dictionaries, and the job dictionary entry for a stroke takes precedence over the same stroke in the personal dictionary. If the selected Jdefine dictionary entry for "S" is Mr. Socrates and the job dictionary entry for "S" is Mr. Smith, when the Jdefines dictionary is enabled, the stroke "S" will translate into Mr. Socrates and not Mr. Smith.

FIG. 6 further illustrates the multiple job dictionary features of the control program. The shorthand machine 40 can store up to 10 separate job dictionaries at a time. For a given search, the shorthand machine 40 will search only those job dictionaries that are enabled. This feature is particularly useful in situations where the operator has several consecutive jobs, each calling for separate job dictionaries. The operator can load all of the job dictionaries into the shorthand machine at once, and enable only those he/she needs for the particular job.

Figure 7:
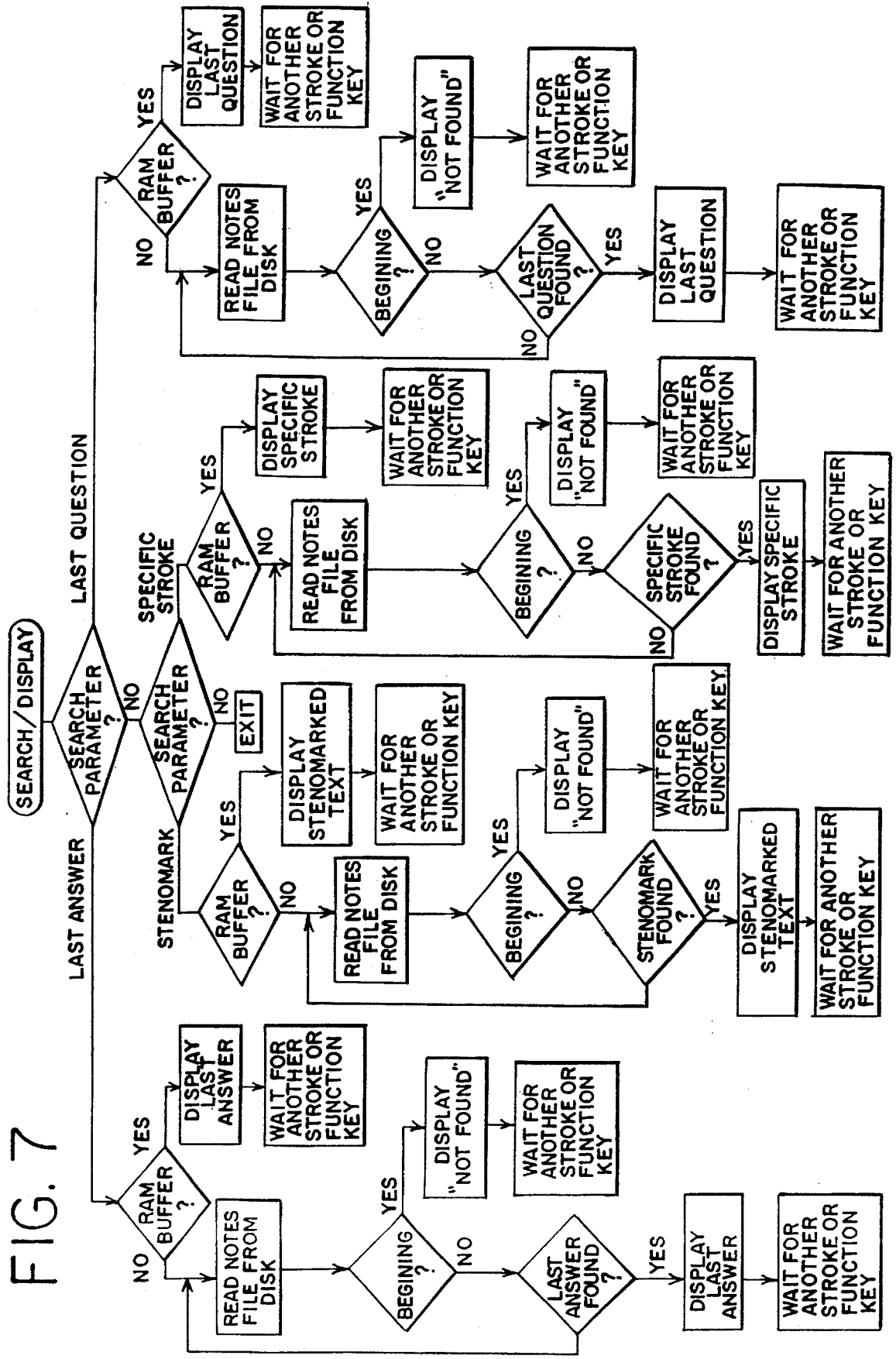
FIG. 7 is a flow diagram illustrating a preferred operation of a program for searching the translated text and displaying a predetermined portion of the translated text on the LCD of the shorthand machine shown in FIGS. 3–5.

Turning to FIG. 7, a preferred operation of a control program for searching the translated text file to display a particular portion of the text on the LCD 50 will now be described. The control program may be configured to search and display any parameter that is appropriate for that particular setting. The following example is related to a court-related interrogation which will be displayed on the LCD 50 in a question and answer format. The operator can enter the desired search function by engaging the appropriate function key 70. In this example, the search functions include searching for the last answer, searching for the last question, searching for a particular stroke, and searching for a stenomark. The stenomark marks a particular stroke entered. This can be accomplished by providing a dedicated function key 70 or defining a stroke as to the stenomark. The stenomark occupies a bit in the bytes representing the notes in the notes file.

The program asks what search parameter was entered. If the search parameter is the last answer, the program asks whether the last answer is in the RAM buffer. If the answer to the "RAM buffer?" inquiry is yes, then the last answer is displayed on the LCD 50 and the program waits for another stroke or another function key. If the answer to the "RAM buffer?" inquiry is no, the program reads the notes file from the disk. The program then asks whether it is at the beginning of the notes file. If the answer to this inquiry is no, the program goes back and reads the previous line of the notes filed on the disk, searching backward until the last answer or the beginning of the file is reached. If the last answer is found, the program displays the last answer and waits for the next stroke or another function key. The search inquiry for the last question, the stenomark and the specific stroke proceed in the same manner as the search inquiry for the last answer. In a similar fashion, a function key can be dedicated to scrolling through the LCD display by searching sequentially through either the notes file or the text file and displaying the search area on the LCD 50.

Figure 8:
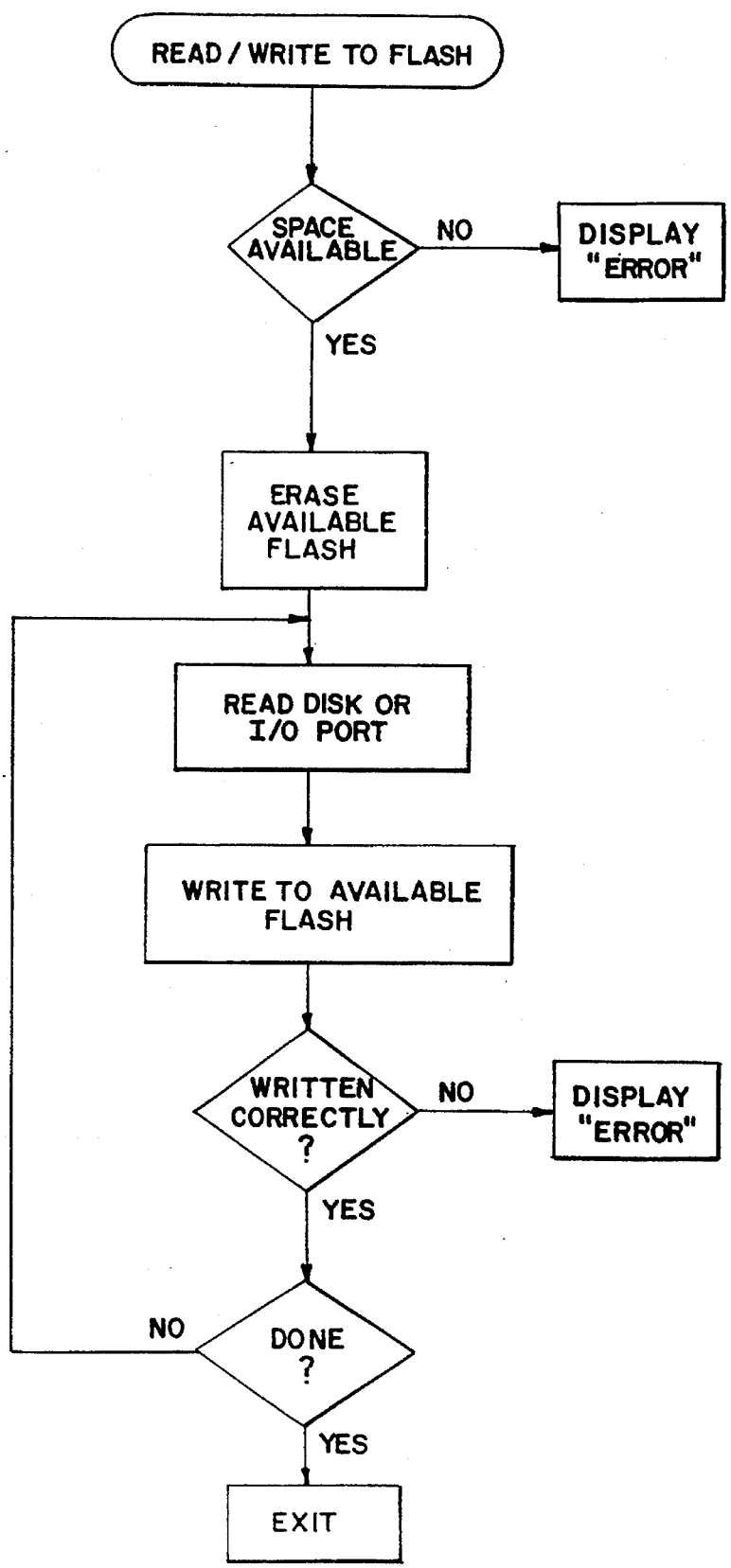
FIG. 8 is a flow diagram illustrating a preferred operation of a program for writing to the memory of the shorthand machine shown in FIGS. 3–5.

Turning to FIG. 8, a preferred operation of a control program for reading information into the Flash EPROM from a disk in the disk drive or from the I/O port is described. The operation may also be utilized to update the control program itself in the same fashion. The program may be initiated in any suitable manner such as by a function key, or by a special signal from a special disk placed in the disk drive. The program asks whether there is space available in the flash memory. If the answer to this inquiry is no, an error message is displayed on the LCD 50. If the answer to this inquiry is yes, the available space in Flash EPROM is erased, and the information is read from the disk in the disk drive or from the I/O port. The information read is then written into the erased memory locations. The program then asks whether the information was written correctly. If no, then an error message is displayed on the LCD 50. If yes, then the program asks whether all of the input is done. If no, then the program returns to read more information from the disk in the disk drive or from the I/O port. If yes, the program exists.

The shorthand machine 40 also includes a file that is read by the control program to set up certain display parameters and style preferences. For example, one operator may prefer 3 spaces before a question, while another may prefer none. Those formatting preferences are read from the display parameters file and control both the display and any printing that is done via the communication port.

Power savings are achieved in several areas with the shorthand machine 40. The control programs are designed to be extremely energy conscious by providing power to the hardware components only when they are performing a function. Otherwise, the hardware elements are maintained in a "sleep mode." For example, the Hitachi HD 64180 CPU includes a "power down mode" which is activated by the control program when the CPU is not in use. Also, the control program turns the disk drive 68 and I/O ports 66 on when they are in use, and turns them off when they are not in use. For the functions defined herein, the sleep mode can occupy 60–80% of the time that the machine 40 is in use. The CPU 58 may be relatively slow (6 MHZ), thus requiring less power. The non-volatile Flash EPROM 64 does not require continuous power to maintain its contents. Also, the NRBT reduces size without compromising capacity, thus reducing power consumption while providing the enhanced performance. Thus, the shorthand machine's ability to operate for extended periods on battery power is enhanced. Alternatively, power may be provided to the shorthand machine via a direct connection to an AC wall outlet.

Figure 9:
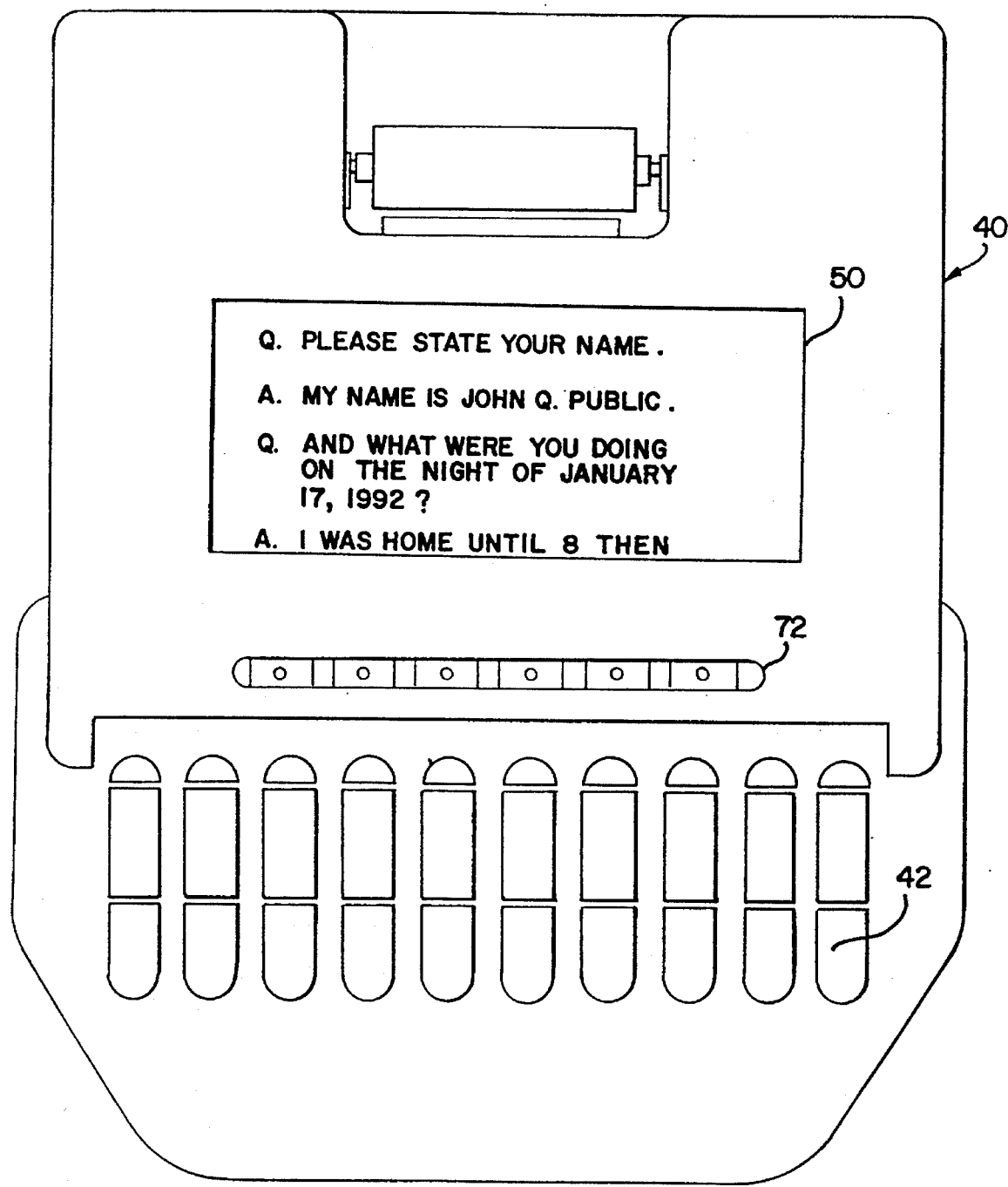
FIG. 9 illustrates an example of translated text displayed on the LCD of the shorthand machine shown in FIGS. 3–5.

FIG. 9 illustrates one example of how translated text may be displayed on the LCD 50. In court-related proceedings, the record is produced in a Question and Answer format. FIG. 9 illustrates a translation for a court-related proceeding such as a deposition. The translation appears immediately after the stroke is entered.

Thus, the shorthand machine 40 provides a wide variety of CAT operations which heretofore have been unavailable in a shorthand machine. The machine 40 includes an onboard user-updatable translation dictionary which is used to immediately translate the entered shorthand notes into one or more written languages. The translated text is displayed immediately on several lines of the LCD 50 for convenient viewing by the operator. The translated text may also be written to an integral disk or output to peripherals via the I/O serial ports. Information can be loaded into the machine's Flash memory via the disk drive and the I/O ports thus allowing the operator to load personal and/or job dictionaries directly into the machine. The machine 40 includes function keys 70 for performing a variety of manipulations on the stored notes file and text file such as displaying the text in a particular format, "scrolling" through the text, or searching through the text for a particular word or other mark.

A listing of computer code sufficient for carrying out the functions illustrated and described in this application is included in an Appendix. The computer code is source code written in 64180 Assembler programming language .

Although the present invention has been described with reference to a preferred embodiment, it will be clear to one of ordinary skill in the art that certain rearrangements and modifications might be made within the scope of the invention. All such modifications and their equivalents are intended to be covered by the appended claims.

I claim:

1. A method of organizing a non-redundant binary tree look-up table to store electric signals representing groups of one or more entry symbols, and electric signals representing translation symbols corresponding to the groups of entry symbols, the steps comprising:

providing a main level of memory locations;

storing particular sublevel pointer addresses in selected ones of said main level memory locations;

providing a plurality of sublevels of memory locations;

associating selected sublevels with selected ones of said sublevel pointer addresses located in said main level;

storing particular pointer addresses in selected memory locations in said plurality of sublevels;

associating selected ones of said plurality of sublevels with selected ones of said sublevel pointer addresses located in said sublevel memory locations such that selected sublevels are associated with selected other sublevels thereby forming a binary tree; and allocating no more than one of the entry symbols from the groups of entry symbols to said main level and sublevel memory locations containing pointer addresses.

2. The method defined in claim 1 wherein said electric signals are digital bytes.

3. The method defined in claim 1 further comprising the steps of:

storing particular translation pointer addresses in selected rows of said main level and selected rows of said plurality of sublevels;

said particular translation pointer addresses corresponding to translation memory locations containing at least one group of translation symbols.

4. The method of claim 1 wherein said entry symbols are alphabet letters and said groups of one or more entry symbols are phonetic words.

5. The method of claim 1 wherein said entry symbols are phonetic words and said groups of one more entry symbols are phonetic phrases.

6. A shorthand machine for recording and translating shorthand notes including a non-redundant binary tree look-up table comprising:

a keyboard having keys representing letter symbols of a language;

conversion means connected to said keyboard for generating a particular electric shorthand signal for each key or combination of keys pressed by an operator;

a look-up table having a plurality of entries for electronically storing a translation dictionary;

said look-up table further having main level and sublevel memory locations for storing said electric shorthand signals representing groups of one or more entry symbols, and electric signals representing groups of one or more translation symbols corresponding to the groups of entry symbols, said main level and sublevel memory locations containing no more than one of the groups of entry symbols;

control means connected to said conversion means and to said look-up table;

said control means capable of searching said look-up table entries to locate and read a particular electric translation signal corresponding to the particular electric shorthand signal generated at said conversion means; and display means connected to said control means for converting a predetermined number of said read translation signals into groups of display characters representing language words and displaying said words on a plurality of lines.

7. The device defined in claim 6 wherein said display means comprises a liquid crystal display capable of displaying approximately forty characters per line.

8. The device defined in claim 7 wherein said display means comprises a liquid crystal display capable of displaying approximately fifty characters per line.

9. The device defined in claim 6 wherein said display means is capable of displaying graphic symbols and proportional text characters of different sizes and styles.

10. The device defined in claim 6 further comprising:

a clock/calendar chip connected to said control means for generating at least one time parameter; and said control means being capable of transferring said at least one time parameter to said display means for displaying said time parameter.

11. The device defined in claim 10 wherein said at least one time parameter is the date.

12. The device defined in claim 10 wherein said at least one time parameter is the current time in hours and minutes.

13. The device defined in claim 10 wherein said at least one time parameter is the elapsed time for a particular transcribing session.

14. The device defined in claim 6 wherein said control means comprises:

a central processor;and at least one control program executed by said central processor, whereby said central processor and said control program instruct the look-up table to search its entries, and instruct the display means to convert the read translation signals into said display characters.

15. The device defined in claim 6 wherein said control means is capable of accumulating the read translation signals in a text file.

16. The device defined in claim 15 wherein a storage device is connected to said control means and said text file is stored on said storage device.

17. The device defined in claim 16 wherein said storage device is a disk drive connected to said control means is located on a disk in said disk drive.

18. The device defined in claim 6 wherein said control means is capable of accumulating the particular electric shorthand signals generated at said conversion means in a notes file.

19. The device defined in claim 18 wherein a storage device is connected to said control means and said notes file is stored on said storage device.

20. The device defined in claim 19 wherein the storage device is a disk drive connected to said control means and said notes file is located on a disk in said disk drive.

21. The device defined in claim 15 wherein:

at least one function key is in communication with said control means for directing said control means to search through said text file for a predetermined portion of said accumulated electric translation signals and display the characters associated with the predetermined portion of said accumulated electric translation signals on said display means.

22. The device defined in claim 18 wherein:

at least one function key is in communication with said control means for directing said control means to search through said notes file for a predetermined portion of said accumulated electric shorthand signals;

said at least one function key further directing said control means to search said look-up table for the electric translation signals corresponding to said predetermined portion of said accumulated electric shorthand signals and display the characters associated with the corresponding electric translation signals on said display means.

23. The device defined in claim 21 wherein said at least one function key directs said control means to scroll through said text file and display language characters associated with said predetermined portion of said text file on said display means.

24. The device defined in claim 22 wherein said at least one function key directs said control means to scroll through said notes file and display language characters associated with said predetermined portion of said notes file on said display means.

25. The device defined in claim 21 wherein:

said keyboard includes at least one stenomark key which, when pressed, generates an electric stenomark signal at said key contact, said electric stenomark signal being stored in said text file; and said predetermined portion of said text file being the portion of the text file that contains said stenomark signal.

26. The device defined in claim 22 wherein:

said keyboard includes at least one stenomark key which, when pressed, generates an electric stenomark signal at said key contact, said electric stenomark signal being stored in said notes file; and said predetermined portion of said notes file being the portion of the notes file that contains said stenomark signal.

27. The device defined in claim 21 wherein the shorthand machine is used to record an interrogation and said predetermined portion of said text file is the portion of said text file containing a question entered by the operator.

28. The device defined in claim 21 wherein the shorthand machine is used to record an interrogation and said predetermined portion of said text file is the portion of said text file containing an answer entered by the operator.

29. The device defined in claim 22 wherein the shorthand machine is used to record an interrogation and said predetermined portion of said notes file is the portion of said notes file containing a question entered by the operator.

30. The device defined in claim 22 wherein the shorthand machine is used to record an interrogation and said predetermined portion of said notes file is the portion of said notes file containing an answer entered by the operator.

31. The device defined in claim 6 further comprising a printing mechanism connected to said keyboard for printing shorthand notes on a paper tape in response to a key or a combination of keys being pressed.

32. The device defined in claim 6 wherein said printing mechanism further comprises a ribbon cartridge having an inked ribbon for providing ink to said printing mechanism.

33. The device defined in claim 6 wherein said printing mechanism further comprises:

a platen for advancing said paper tape;

type bars connected to said keyboard such that one or more of said type bars are urged toward said platen in response to one or more of said keys being pressed;

an advancing mechanism for advancing an inked ribbon over said paper tape on said platen such that, when said type bars are urged toward said platen, said type bars urge said inked ribbon into contact with said paper tape at said platen, thereby impressing an ink symbol on said paper tape.

34. The device defined in claim 6 wherein:

said look-up table stored in erasable programmable memory capable of being erased and written to by a voltage;

said control means also connected to a communication port and said control means capable of reading electric information signals from said communication port, erasing memory locations in said erasable programmable memory and writing said electric information signals into said memory locations.

35. The device defined in claim 34 wherein said communication port is connected to a peripheral device capable of generating electric information signals.

36. The device defined in claim 35 wherein said peripheral device is a computer capable of receiving electric information from said communication port and displaying said electric information on a computer terminal.

37. The device defined in claim 36 wherein said computer is connected to said communication port via a modem.

38. The device defined in claim 34 wherein said communication port is connected to a printer capable of receiving said electric information and printing said electric information in a readable form.

39. The device defined in claim 34 wherein said electric information signals are written into said translation dictionary.

40. The device defined in claim 34 wherein said translation dictionary comprises a personal dictionary and at least one selectable job dictionary.

41. The device defined in claim 6 wherein:

said look-up table stored in erasable programmable memory capable of being erased and written to by a voltage;

said control means also connected to a storage medium and said control means capable of reading electric information signals from said storage medium, erasing memory locations in said erasable programmable memory and writing said electric information signals into said memory locations.

42. A shorthand machine for recording and translating shorthand notes comprising:

a keyboard having keys representing language symbols;

conversion means connected to said keyboard for generating a particular combination of digital shorthand signals for each key or combination of keys pressed;

a look-up table for storing a translation dictionary, said translation dictionary generally comprising a plurality of sets of stored digital shorthand signals, each set of stored digital shorthand signals representing a particular shorthand stroke that may be entered at the keyboard, said translation dictionary further comprising a plurality of sets of stored digital language signals, each set of stored digital language signals representing a language word and corresponding to one set of said stored digital shorthand signals;

said look-up table being organized as a non-redundant binary-tree look-up table;

said non-redundant binary-tree look-up table generally comprising a binary-tree look-up table having only one of said plurality of sets of digital shorthand signals allocated to a particular memory location;

control means connected to said conversion means and to said look-up table;

said control means capable of searching said look-up table to locate the particular set of stored digital shorthand signals that corresponds to the combination of digital shorthand signals entered at the keyboard and reading the set of stored digital language signals that correspond to the located set of stored digital shorthand signals; and display means connected to said control means for converting stored digital language signals read by said control means into a display character and displaying said character.

43. The device defined in claim 42 wherein power is provided to said shorthand machine by a battery pack.

44. The device defined in claim 42 wherein said non-redundant binary-tree look-up table further comprises:

a main level of memory locations, selected ones of said main level of memory locations containing a particular sublevel pointer address; and a plurality of sublevels of memory locations, selected ones of said sublevels associated with selected ones of said sublevel pointer addresses located in said main level memory locations, selected ones of said plurality of sublevels' memory locations also containing a particular sublevel pointer address;

selected ones of said plurality of sublevels associated with selected ones of said sublevel pointer addresses located in said sublevel memory locations such that selected sublevels are associated with selected other sublevels thereby forming a binary tree; and each main level and sublevel memory location also containing only one member from a particular set of said stored digital shorthand signals.

45. The device defined in claim 44 wherein selected ones of said main level memory locations and selected ones of said plurality of sublevel memory locations contain a particular translation pointer address corresponding to a memory location containing one set of said stored digital language signals representing the language translation of the particular shorthand stroke entered at the keyboard.

* * * * *